Sept. 14, 1965      W. W. WOOD, JR      3,205,592
              TRAINING APPARATUS
Filed Jan. 22, 1963                2 Sheets-Sheet 1

WILLIAM W. WOOD JR
INVENTOR

BY
ATTORNEY

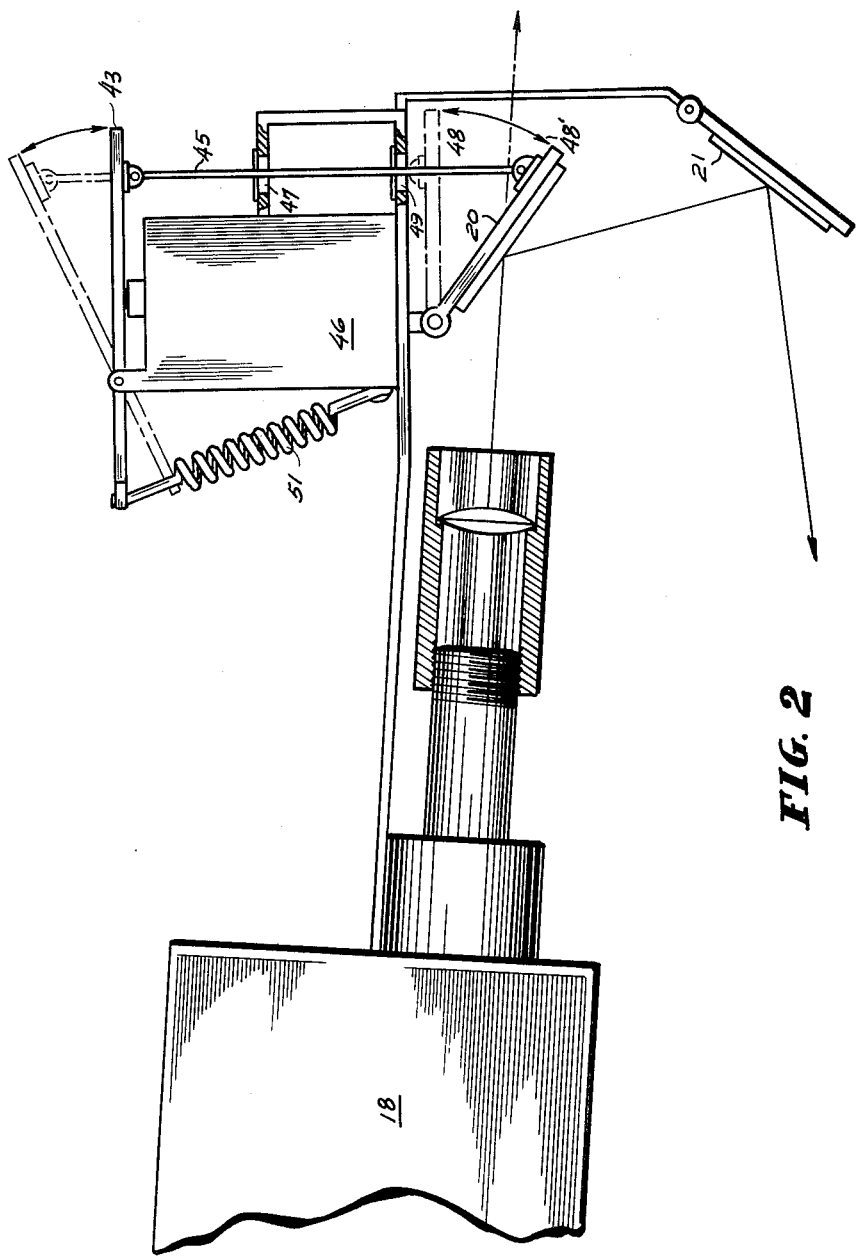

United States Patent Office 3,205,592
Patented Sept. 14, 1965

3,205,592
TRAINING APPARATUS
William W. Wood, Jr., Binghamton, N.Y., assignor to General Precision, Inc., Binghamton, N.Y., a corporation of Delaware
Filed Jan. 22, 1963, Ser. No. 253,203
10 Claims. (Cl. 35—11)

This invention relates to a training apparatus and more particularly to an apparatus for training and testing one or more operators of vehicles subject to forward and reverse motion.

For the obvious reason that the operation of vehicles, such as automobiles, motorcycles, bicycles, and the like, upon a public thoroughfare is inherently dangerous, the advantages of providing a simulated training apparatus for initially training and testing inexperienced operators prior to the operator's undertaking the control of an actual vehicle, as well as for the retraining and retesting of experienced operators, are readily apparent. Therefore, according to the prior art, there have been provided a large number of such simulated training apparatuses. In general, a large majority of the prior art apparatuses include an operator's station furnished with dummy controls and indicating devices which simulate the controls and indicating devices of an actual vehicle. Realistic problems are then presented to the operator by means of a motion picture projector in combination with a single projection screen positioned forward of the operator. The skill and reaction time of the operator in response to the problem presented upon the screen is then monitored and/or indicated.

It has been difficult until now, however, to provide an economical simulated training apparatus which is effective to realistically simulate the problems involved both when the apparatus is subjected to simulated rearward motion as well as when the apparatus is subjected to simulated forward motion. It has been proposed that a mirror be positioned either adjacent the side or to the rear of the operator in order to selectively present to the trainee both forward and reverse scenes while still employing the combination of a single projector and a single screen. However, each of these suggestions suffers from at least one important defect; the side view mirror does not provide realistic scenes such as would be desired by way of example, in parking an actual vehicle in urban areas, and a mirror positioned behind the operator presents a reflection of the scene projected forward of the operator which is disorted by the physical presence of the operator blanking out a significant area of the scene.

According to the invention, however, there is provided an improved apparatus for realistically simulating the problems involved both when the apparatus is subjected to simulated rearward motion as well as when the apparatus is subjected to simulated forward motion, together with a novel method of accomplishing these objectives. It should be noted, and this is an important feature of the invention, that the to be described invention is not confined to any particular vehicle simulator, but is broadly applicable to any of the numerous vehicle simulators of the prior art, totally independent of the structure and/or method of monitoring, checking, and indicating the operator's operation of the simulator. Solely for the purpose of illustrating an application of the invention, and not by way of limitation, the invention, in a preferred embodiment, will be described in conjunction with the apparatus disclosed in copending application Serial No. 180,428, filed March 3, 1962, and now abandoned on behalf of G. H. Sheridan and assigned to the assignee of this application. As there disclosed, digital data coded on the film sound track operates monitoring equipment to check whether the various trainee operated controls are properly positioned at various times, and student errors are indicated. However, as will be understood as the description proceeds, the application of the present invention to any of the prior art vehicle simulators will be obvious.

Briefly, the present invention provides forward and reverse simulated motion problems from a single movie projector through the use of a pair of projection screens, a first positioned forward of the operator-trainee and a second positioned behind the operator, and a selectively interposed optical device, such as a mirror or the like, which is effective to allow the scene to be directed to one of said screens or, alternatively, to direct the scene to the other of said screens. In this manner, the operator is provided with a realistic scene either in front or behind the operator's station in an economical and efficient fashion. Further, in a preferred embodiment, the positioning of the optical device is controlled by one of the pulse trains recorded on the motion picture film sound track As disclosed in the above referenced copending application, a decoding device is provided which is operable to decode a maximum of 32 distinctive pulse trains, although only 19 individual pulse trains are employed in the specific operation described in detail. Thus, merely by employing a distinctive twentieth pulse train to operate the movable optical device, as more particularly hereinafter described, the single projector is caused to illuminate one or the other of the screens.

It is an object of the invention to provide an improved training apparatus.

Another object of the invention is to provide a simulated vehicle training apparatus operable to realistically simulate problems both when the apparatus is subjected to simulated rearward motion as well as when the apparatus is subjected to simulated forward motion.

A further object of the invention is to provide, in a simulated vehicle training apparatus, a novel method of directing the scene supplied from a single motion picture projector to any one of a plurality of projection screens located about the trainee's position.

Still another object of the invention is to provide a simulated training device operable to present forward and reverse simulated motion problems from a single movie projector.

A related object of the invention is to provide a simulated vehicle training device wherein an optical device is selectively positioned to direct the scene supplied by a motion picture projector to one of a plurality of screens in response to predetermined information stored on the motion picture film.

Yet another object of the invention is to provide an improved training apparatus for training and testing one or more operators of vehicles subject to forward and reverse motion.

A still further object of the invention is to provide a simulated vehicle training apparatus wherein problems to be responded to by the operator-trainee are selectively presented either in front of or to the rear of the training apparatus.

The invention accordingly comprises the features of construction, combination of elements, and arrangements of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 2 is an enlargement of a portion of the apparatus shown in FIG. 1.

Figure 1:
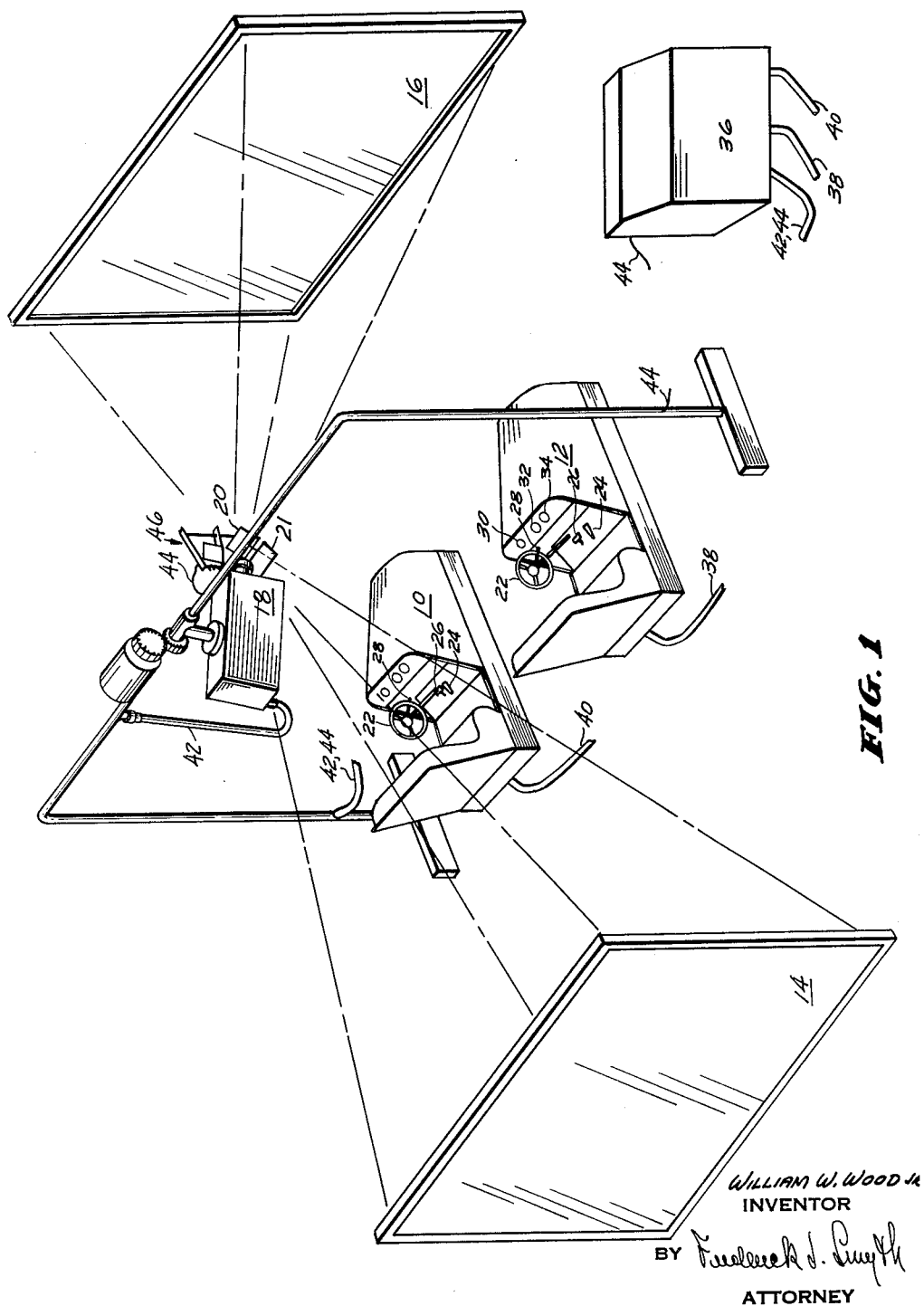
FIG. 1 is a view illustrating the general arrangement of a preferred embodiment of the apparatus of the invention.

In the detailed description to follow, it should be understood that the preferred embodiment is illustrated as including one or more operator-trainee stations equipped with a number of simulated control devices for operation by the student such as, by way of example, an accelerator pedal, a brake pedal, a steering wheel, a transmission shift lever, and a clutch, if manual transmission rather than automatic transmission is to be simulated, together with a plurality of simulated indicator devices such as a speedometer, a fuel gauge, an oil pressure gauge, a temperature gauge or the like. Further, a single projector is provided to present upon a screen, a sequence of scenes to present to the trainees a series of problems or tests, the reaction of the trainee thereto being determined by monitoring and indicating the trainee's operation of the simulated control devices in accordance with the specific problem presented. Although the present invention may additionally be utilized in conjunction with more complicated training apparatuses such as those which include a projection television system wherein the television camera is positioned adjacent a simulated highway scene in response to the trainee's operation of the simulated controls, in order to emphasize a primary feature of the invention, namely, that problems involving simulated forward and reverse motion are realistically provided, the invention will be described with reference to the above referred to copending application, to which reference should be made, or alternatively, to any standard simulated vehicle training reference, should it be necessary to understand the detailed operation of a simulated vehicle training apparatus.

Referring now to the drawings, there is illustrated in FIG. 1 the general arrangement of the apparatus of the invention. As there shown, the apparatus includes one or more student-trainee stations, generally indicated as 10 and 12, it being understood that only one, or a greater number of such stations, may be employed as desired, located intermediate first and second projection screens 14 and 16. Screen 14 is effective to display the scenes necessary to present problems and tests during simulated rearward motion and screen 16 is effective to display the scenes necessary to present problems and tests during simulated forward motion. A single projector 18 is provided which is positioned to normally display the scene stored on a film upon screen 16. During those time intervals when simulated rearward motion is desired, a mirror 20 is selectively interposed in the optical path between projector 18 and screen 16 and is so positioned that the scene provided by projector 18 is now displayed upon screen 14 in conjunction with auxiliary mirror 21. It should be understood, that, in order to ensure the scenes displayed upon screen 14 and 16 are each in focus, the optical path length between projector 18 and screen 16 is identical to the length of the optical path between projector 18, mirrors 20 and 21, and screen 14.

Since the actual apparatus and its method of operation forms no part of the present invention, no detailed description thereof is included in this specification. However, by way of illustration, a brief summary of the operation of the training apparatus of the above-reference copending application Serial No. 180,428 will next be described.

As there disclosed, the apparatus includes a unique D.C. analog simulation of an automobile engine-transmission-speedometer system using RC circuits without operational amplifiers. A motion picture projector presents a program and sequence of trip scenes to the student, and digital data coded on the film sound track operates monitoring equipment to check whether the various student operated controls are properly positioned at various instants, and student errors are indicated. Serial 5-digit pulse trains are recorded on the film sound track. They are read and fed into a shift register to provide a parallel binary number, which is decoded to energize a conductor associated with a given control condition to be monitored. In the specific embodiment shown therein, nineteen different and separate operating conditions of the simulated car are sensed to determine whether or not student action is correct, and hence nineteen different binary numbers are coded on films to be used with the device, for the purpose of indicating which operating condition should be checked. Since the binary decoding matrix employed allows up to 32 tests to be made, more or less tests than 19 may be utilized when a given binary number is encoded on the film and read by that apparatus, and a selected output wire of the decoding matrix is energized. By way of example, the binary number "five" may be coded on the film with a scene or sequence which demands that the student steer full to the right. Upon decoding the binary number, the matrix energizes its number five output conductor, thereby directing a voltage to an error indicating device. However, if the student is steering full to the right at the time the number five output conductor is energized, a switch electrically connected in series with the number five conductor is opened, thereby preventing energization of the error device. Alternatively, if the student is steering in any other direction the switch remains closed, and the error device is energized. Complete details are, of course, to be found in the copending application.

Referring again now to the FIG. 1, apparatus similar to that above described is illustrated in general form. Each of the student-trainee stations is equipped with a number of simulated controls such as steering wheel 22, an accelerator pedal 24, a brake pedal 26, a transmission shift lever 28, etc., as well as a number of simulated indicator devices such as a speedometer 30, a fuel gauge 32, a temperature gauge 34, etc. Operation of the simulated controls by the student results in the various simulated indicators responding thereto, as a result of the above mentioned simple RC analog computer associated with each student's station. By way of example, depression of the simulated accelerator pedal by the student is effective to generate a voltage which, when applied to the simulated speedometer, results in a higher rate of speed being indicated. Conversely, depression of the simulated brake pedal is effective to decrease the magnitude of the generated voltage to thereby decrease the rate of speed being indicated by the simulated speedometer. Further, the operation of each control is sensed, by any convenient method such as potentiometers, stepping switches, and the like as will be understood by those skilled in the art, and conveyed to an error comparison unit 36 by means of a pair of cables 38 and 40. Additionally, the binary information encoded on the film sound track is also conveyed to comparison unit 36 by means of a cable 42 wherein it is decoded and operable to energize a selected output line. Next, errors are indicated if the control and/or controls being tested are not properly positioned, as stated above.

Thus far, the operation of the apparatus shown in the FIG. 1 is identical with that described in the above referenced copending application. The improvement of the present invention is primarily directed to providing simple means to also simulate reverse motion without the addition of a relatively complex and expensive second projector.

Immediately prior to a time interval during which a problem or test requiring simulated reverse motion is to be presented, an indication is projected on screen 16, such as "back up" or the like, to inform the student that he should now view screen 14. Additionally, a predetermined binary code group, stored on the sound track of the film in projector 18, is delivered to comparison unit 36, which, upon being decoded therein, is effective to momentarily energize a line 44. Line 44 is connected to a latching solenoid 46, and the energization thereof is operable to change the position of mirror 20 from that indicated as 48 to that indicated as 48' (see FIG. 2). Alternatively, line 44 could be connected to a bistable device such as a flip-flop which in one state operates to maintain a conventional solenoid energized and thus support mirror 20 in the position 48', and in the other state operates to maintain the solenoid deenergized and thus support mirror 20 in the position 48. However, it is preferred to employ a latching solenoid which dissipates power only during the time interval mirror 20 is moving between positions 48 and 48'. Alternatively, as will be understood by those skilled in the art, various other well known motive devices, such as motors, relays, servos, etc., could be substituted for solenoid 46, but since the selected motive device is not a primary feature of the present invention, these other devices will not be further described herein.

Referring more specifically now to FIG. 2, there is shown in detail, a preferred device for selectively positioning mirror 20 at either location 48 to present the scenes from projection 18 upon forward screen 16, or at location 48' to present the scenes from projector 18 upon rearward screen 14. As there shown, an armature 43 of latching solenoid 46 is slidably engaged with one end of a linkage member 45, the other end of which is slidably engaged with mirror 20. Latching relay 46 may be any of the conventional types such as those which include a hold-latch coil and a release coil. Upon the first energization of line 44, armature 43 is attracted to the body of solenoid 46 providing downward motion to member 45. The motion of the latter, restrained by bearings 47 and 49, imparts pivotal motion to mirror 20, thereby translating the mirror from position 48 to position 48'. The next energization of line 44 is effective to restore armature 43 to the position shown in FIG. 2 in cooperation with a spring 51. It should be understood that, although a fixed auxiliary mirror 21 is employed to aid in obtaining rearward projection from a forward directed projector, this is desired solely to position mirror 20 closely adjacent to projectior 18 and thereby reduce the size of mirror 20, it being understood that a single large mirror, spaced further from projector 18 could be substituted.

With mirror 20 fixed at position 48', it should be understood that the entire scene provided by projector 18 is intercepted and directed to, and presented upon, screen 14. Thus, in providing a problem to the student requiring a simulated backing up operation, by properly preparing the film by photographing the scene through the rear window of an actual vehicle and, if only a single mirror or an odd number of mirrors are substituted for the even pair of mirrors shown in the preferred embodiment, reversing the scene prior to projection in order to compensate for an odd number of reflections, realistic simulated rearward motion is attained.

Immediately prior to the next forward motion problem, a reverse cycle of operations is performed, that is, an indication is displayed on screen 14, such as "drive forward," to inform the student that he should now look ahead towards screen 16. Again, by means of unit 36, the predetermined code group stored on the film in projector 18 is effective to momentarily energize solenoid 46 to restore mirror 20 to position 48, resulting in the scene provided by projector 18 once more being presented on screen 16. In this manner, through the selective interposition of a mirror in the field of view of a motion picture projector under control of data stored along the length of the motion picture film, the scenes provided by the projector are displayed either in front of or behind the operator-trainee thereby providing both simulated realistic forward and reverse motion problems.

Additionally, manual control of mirror 20 by the instructor is provided to impart additional flexibility to the apparatus of the invention. As well know in the trainer art, a plurality of manual controls are provided for the instructor to provide separate problems and emergency indications to the trainees, either in conjunction with the film problems or in addition thereto. Thus, by providing manual control of mirror 20 by the instructor, the problems interposed by the examiner can readily be extended to those which include either or both forward or reverse motion.

Although a preferred embodiment of the invention has been described above in detail, it should be understood that several alternate embodiments are additionally available. By way of example, should a binary decoding matrix not be available at the particular installation, simple binary coding on the control portion of the film sound track, that is, light and dark areas, may be substituted. Then by means of a light source directed towards the control portion on one side of the film and a photodetector located opposite the source on the other side of the film, the amplified output of the photodetector can be employed to directly control a conventional solenoid or motor which positions the movable mirror. By way of example, when the dark area of the control portion of the film is passing between the source and the photodetector, the amplified output of the latter is insufficient to energize the solenoid and mirror 20 remains at the position 48, and the scene is projected upon screen 16. However, when a light or transparent area is passing through, the solenoid is energized and mirror 20 is moved to position 48' to reflect the scene to screen 14. It thus can be seen that equivalent operation is attained, although with increased power consumption since the solenoid is continuously energized during those time intervals rearward motion is being simulated.

A further embodiment includes the substitution of a beamsplitter, or half-reflector, fixed at position 48', for movable mirror 20. As is well known by those skilled in the art, a beamsplitter transmits one-half of the light incident thereon as well as reflecting one-half of the incident light. The use of a beam-splitter then is effective to simultaneously display the projected scene on each of screens 14 and 16, although at somewhat reduced light intensity unless a more powerful projection light source is used.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

What is claimed is:
1. A training apparatus comprising,
  (a) a student's station including a plurality of controls and indicating devices simulating those of an actual vehicle subject to forward and reverse motion;
  (b) first and second projection screens;
  (c) means positioning said first screen forward of said student's station and said second screen behind said student's station;
  (d) means for projecting scenes stored on motion picture film onto one of said screens and directing binary data stored on the sound track of said motion picture film to decoding means; and
  (e) means responsive to said decoding means to direct said scenes to the other of said screens.
2. The apparatus of claim 1 wherein said last named means includes means for positioning a reflecting device intermediate said projection means and said one screen.
3. A training apparatus comprising,
  (a) a student's station including a plurality of controls and indicating devices simulating those of an actual vehicle subject to forward and reverse motion;
  (b) means providing forward and reverse motion problems to said student's station;

(c) said last named means including single means to project scenes stored on motion picture film to one of a plurality of projection screens arranged about said student's station and means for directing indicia stored on said film in parallel with selected ones of said scenes to decoding means; and (d) means selectively operable in response to indicia stored on said film as decoded by said decoding means to interpose an optical device between said single means and said one of said plurality of projection screens to direct said scenes to another one of said plurality of projection screens.

4. A training apparatus comprising, (a) a student's station including a plurality of controls and indicating devices simulating those of an actual vehicle subject to forward and reverse motion;

(b) first and second projection screens;

(c) means positioning said first screen forward of said student's station and said second screen behind said student's station;

(d) projection means for directing all scenes recorded on motion picture film towards said first screen; and (e) means selectively operable for positioning an optical device intermediate said projection means and said first screen for directing all scenes recorded on said motion picture film towards said second screen.

5. The apparatus of claim 4 wherein said optical device comprises beam splitter means operable both to transmit all of said directed scenes to said first screen and to reflect all of said directed scenes to said second screen, simultaneously.

6. The apparatus of claim 4 wherein said optical device comprises a mirror for reflecting all of said directed scenes to said second screen.

7. The apparatus of claim 6 wherein further means are provided selectively operable in response to said indicia stored on said film as decoded by said decoding means to inhibit said selectively operable positioning means.

8. A training apparatus comprising, (a) a simulated vehicle;

(b) first and second movie screens;

(c) means positioning said first screen forward of and said second screen rearward of said simulated vehicle;

(d) means for projecting scenes stored on motion picture film towards and upon said first screen to simulate realistic forward motion, and means for detecting binary data encoded on said film; and (e) means operable in response to said binary data encoded of said film as decoded by said detecting means for interposing a reflecting mirror between said projecting means and said first screen for reflecting scenes directed towards said first screen upon said second screen to simulate realistic rearward motion.

9. A training apparatus comprising, (a) a simulated vehicle;

(b) first and second movie screens;

(c) means positioning said first screen forward of and said second screen rearward of said simulated vehicle;

(d) projection means for projecting all scenes stored on motion picture film towards and upon said first screen to simulate realistic forward motion; and (e) optical means positioned intermediate said projection means and said first screen for directing all of said scenes stored on said motion picture film toward and upon said second screen to simulate realistic rearward motion, said optical means comprising a mirror and means selectively operable to position said mirror at a first location at which said mirror reflects all of said scenes projected by said projection means toward and upon said second screen and to position said mirror at a second location at which said mirror is ineffective to reflect any portion of said scenes projected by said projection means.

10. The apparatus of claim 9 including further means responsive to further data stored on said motion picture film to alternatively position said mirror at said first and second locations.

References Cited by the Examiner

UNITED STATES PATENTS

| 1,650,479 | 11/27 | Woodland. | |
| 2,070,787 | 2/37 | Frocht | 40—130 X |
| 2,074,991 | 3/37 | Salcedo | 88—24 |
| 2,120,596 | 6/38 | Avey | 88—24 |
| 2,422,376 | 6/47 | Turner et al. | 88—1 |
| 2,738,702 | 3/56 | Angenieux | 88—1 |
| 2,935,794 | 5/60 | Durham | 35—11 |

EUGENE R. CAPOZIO, *Primary Examiner.*

JEROME SCHNALL, LAWRENCE CHARLES,
*Examiners.*